Patented Feb. 5, 1952

2,584,314

UNITED STATES PATENT OFFICE 2,584,314

PYRAZOLOPYRIDINES

Dennis Arthur William Adams and George Fawthrop, Blackley, Manchester, England, assignors to Imperial Chemical Industries Limited, a corporation of Great Britain No Drawing. Application July 31, 1950, Serial No. 176,910. In Great Britain August 12, 1949

8 Claims. (Cl. 260—296)

This invention relates to dyestuff intermediates and more particularly to new heterocyclic dyestuff intermediates and to a process for the manufacture thereof.

The new dyestuff intermediates of our invention are the 2 - aryl - 3:4:6-triketo-2:3:4:5:6:7-hexahydro-pyrazolopyridines of the formula:

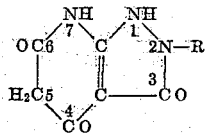

where R is an aryl radical.

The compounds may exist at least partially in tautomeric forms and such tautomeric forms are to be understood as falling within the scope of our invention.

The system of numbering used in this specification is that given for the parent ring structure in "The Ring Index" by Patterson and Capell—Reinhold Publishing Corporation (1940) No. 762.

As examples of our new dyestuff intermediates there may be mentioned compounds of the above formula in which R is phenyl, p-tolyl, p-chlorophenyl, 3:4-dichlorophenyl or p-methoxyphenol.

The new dyestuff intermediates of our invention have a reactive methylene group in the 5-position activated by the two carboxyl groups in the adjacent 4- and 6-positions. They are of value for use in the manufacture of azo dyestuffs and styryl dyestuffs, and also for use as colour formers in colour photography, for example by incorporating them in the light sensitive emulsion (when R contains a group which renders the compound fast to diffusion), or by adding them to the developer solution (when R contains no such group).

Also according to our invention we provide a process for the manufacture of the new dyestuff intermediates as hereinbefore defined, which comprises condensing a 3-amino-1-aryl-5-pyrazolone with a dialkyl malonate in the presence of an alkali metal alkoxide.

As suitable 3-amino-1-aryl-5-pyrazolones there may be mentioned for example, 3-amino-1-phenyl-5-pyrazolone, 3-amino-1-p-tolyl-5-pyrazolone, 3 - amino-1-p-chlorophenyl-5-pyrazolone, 3-amino-1-(3':4'-dichlorophenyl)-5 - pyrazolone and 3 - amino-1-p-methoxyphenyl-5-pyrazolone.

The condensation is conveniently effected by boiling the 3-amino-1-aryl-5-pyrazolone with the dialkyl malonate, for example diethyl malonate in a solution made by dissolving the alkali metal, for example sodium, in alcohol, and the product may be isolated by distilling off the greater part of the alcohol, adding the residue to water, acidifying and filtering off the solid so formed.

The new intermediates of our invention are especially valuable for use in forming azo dyestuffs which give lakes of high light fastness, good heat stability and non-migratory properties when used in colouring plastics.

The invention is illustrated but not limited by the following examples in which the parts are by weight:

Example 1

35 parts of 3-amino-1-phenyl-5-pyrazolone are added to a solution of 18.4 parts of sodium in 250 parts of absolute alcohol. 70 parts of diethyl malonate are added carefully with shaking, and the mixture so obtained is boiled under reflux for 20 hours. The greater part of the alcohol is distilled off, and the residue is cooled and dissolved in 1000 parts of cold water. Acetic acid is added until the mixture is neutral to Brilliant Yellow paper and the suspension is stirred for ½ hour and filtered. The paste on the filter is stirred with 1500 parts of water, and caustic soda liquor is added to make the suspension just alkaline to Clayton Yellow paper. A complete solution is obtained. The solution is stirred with 10 parts of carbon for ½ hour, screened, and the filtrate is acidified to Congo Red paper by adding hydrochloric acid. The suspension is filtered, and the product is washed with cold water to remove acid and dried. The product may be purified by crystallising from acetic acid and washing with water. When so purified the 2-phenyl-3:4:6-triketo-2:3:4:5:6:7 - hexahydropyrazolopyridine melts with decomposition at 268° C. Calculated for $C_{12}H_9O_3N_3$: N, 17.3. Found N, 17.0.

The azo compounds obtained by coupling the product with for example 4-chloroanthranilic acid give lakes which are of value for colouring plastic materials because of their fastness to light, heat stability and non-migratory properties.

Example 2

In place of the 35 parts of 3-amino-1-phenyl-5-pyrazolone used in Example 1, there are used 41.9 parts of 3-amino-1-p-chlorophenyl-5-pyrazolone when 2 - p - chlorophenyl - 3:4:6 - triketo-2:3:4:5:6:7 - hexahydropyrazolopyridine is obtained. The product may be purified by crystallising it from ethanol and washing with water. It melts with decomposition at 228–230° C. Calculated for $C_{12}H_8O_3N_3Cl$: N, 15.1, Cl, 12.75. Found: N, 15.2, Cl, 12.55.

Example 3

In place of the 35 parts of 3-amino-1-phenyl-5-pyrazolone used in Example 1 there are used 1-p-tolyl-5-pyrazolone. 2-p-tolyl-3:4:6-triketo-2:3:4:5:6:7 - hexahydropyrazolpyridine is obtained. After crystallisation from methanol the product melts with decomposition at 249–250° C. Calculated for $C_{13}H_{11}O_3N_3$: N, 16.3. Found: N, 16.2.

Example 4

In place of the 35 parts of 3-amino-1-phenyl-5-pyrazolone used in Example 1 there are used 41 parts of 3-amino-1-p-methoxyphenyl-5-pyrazolone. 2 - p - methoxyphenyl - 3:4:6 - triketo-2:3:4:5:6:7 - hexahydropyrazolopyridine is obtained which after crystallisation from methanol, melts with decomposition at 234° C.

Example 5

In place of the 35 parts of 3-amino-1-phenyl-5-pyrazolone used in Example 1, there are used 48.8 parts of 3-amino-1-(3':4'-dichlorophenyl)-5 - pyrazolone. 2- (3':4' - dichlorophenyl) - 3:4:6 - triketo - 2:3:4:5:6:7 - hexahydropyrazolopyridine is obtained which after crystallisation from ethanol melts with decomposition at 280–282° C. Calculated for $C_{12}H_7O_3N_3Cl_2$: N, 13.5, Cl, 22.7. Found: N, 13.8, Cl, 22.05.

We declare that what we claim is:

1. New compounds of the formula:

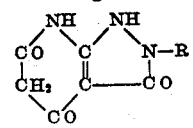

wherein R is phenyl.

2. A new compound according to claim 1 wherein R is phenyl.

3. Process for the manufacture of 2-aryl-3:4:6-triketo - 2:3:4:5:6:7 - hexahydro - pryrazolopyridines which comprises condensing a 3-amino-1-aryl-5-pyrazolone wherein the aryl is a monocyclic aryl, with a dialkylmalonate in the presence of an alkali-metal alkoxide.

4. A new compound according to claim 1 wherein R is p-tolyl.

5. A new compound according to claim 1 wherein R is p-chlorophenyl.

6. A new compound according to claim 1 wherein R is 3:4 dichlorophenyl.

7. A new compound according to claim 1 wherein R is p-methoxyphenyl.

8. Process for the manufacture of 2-aryl-3:4:6-triketo - 2:3:4:5:6:7 - hexahydro - pyrazolopyridines which comprises condensing a 3-amino-1-aryl-5-pyrazolone wherein the aryl is a monocyclic aryl, with a dialkylmalonate in a solution of an alkali metal in alcohol.

DENNIS ARTHUR WILLIAM ADAMS.
GEORGE FAWTHROP.

No references cited.